United States Patent
Huber et al.

(10) Patent No.: US 10,641,196 B2
(45) Date of Patent: May 5, 2020

(54) METHOD FOR DETECTING A GAS AMOUNT

(71) Applicant: INNIO Jenbacher GmbH & Co OG, Jenbach (AT)

(72) Inventors: Johannes Huber, Hippach (AT); Friedrich Gruber, Kramsach (AT)

(73) Assignee: INNIO JENBACHER & GMBH CO OG, Jenbach (AT)

( * ) Notice: Subject to any disclaimer, the term of this patent is extended or adjusted under 35 U.S.C. 154(b) by 0 days.

(21) Appl. No.: 16/097,768

(22) PCT Filed: May 11, 2017

(86) PCT No.: PCT/EP2017/061292
§ 371 (c)(1),
(2) Date: Oct. 31, 2018

(87) PCT Pub. No.: WO2017/194658
PCT Pub. Date: Nov. 16, 2017

(65) Prior Publication Data
US 2019/0162127 A1 May 30, 2019

(30) Foreign Application Priority Data
May 11, 2016 (AT) .................. 50434/2016

(51) Int. Cl.
*F02D 41/14* (2006.01)
*F02D 41/00* (2006.01)
(Continued)

(52) U.S. Cl.
CPC .......... *F02D 41/1446* (2013.01); *F02B 19/00* (2013.01); *F02D 19/024* (2013.01);
(Continued)

(58) Field of Classification Search
CPC ............. F02D 41/1446; F02D 41/0085; F02D 41/2438; F02D 41/2467; F02D 41/0027; F02D 19/025; F02D 19/026; F02D 19/024; F02D 19/028; F02D 2200/0616; F02B 19/00; Y02T 10/125; Y02T 10/32

USPC ................ 123/275, 256, 261, 286, 288, 525
See application file for complete search history.

(56) References Cited

U.S. PATENT DOCUMENTS 5,131,371 A  7/1992  Wahl
5,454,356 A  10/1995 Kawamura
(Continued)

FOREIGN PATENT DOCUMENTS

DE  102007002028 A1  12/2007
DE  102009012250 A1  3/2009
(Continued)

OTHER PUBLICATIONS

International Search Report and Written Opinion dated Mar. 11, 2018 which was issued in connection with PCT application No. PCT/EP2017/061292 which was filed on May 11, 2017.
(Continued)

*Primary Examiner* — Hai H Huynh
(74) *Attorney, Agent, or Firm* — Fletcher Yoder, P.C.

(57) ABSTRACT

A method for detecting the quantity of gas (m) supplied by a gas supply device to an antechamber of an internal combustion engine. The method includes causing a targeted disturbance ($\Delta u$) of the gas quantity (m) supplied by the gas supply device, and measuring a change ($\Delta T$) resulting from the target disturbance ($\Delta u$) in an exhaust gas temperature (T) of an exhaust gas generated in a combustion chamber connected to the antechamber. The method includes comparing the change ($\Delta T$) with a target value of the change ($\Delta T_{target}$) of the exhaust gas temperature (T) to obtain a comparison, and deducing the gas quantity (m) supplied by the gas supply based on the comparison.

20 Claims, 3 Drawing Sheets

(51) Int. Cl.
*F02D 41/24* (2006.01)
*F02B 19/00* (2006.01)
*F02D 19/02* (2006.01)

(52) U.S. Cl.
CPC ......... *F02D 19/025* (2013.01); *F02D 19/026* (2013.01); *F02D 41/0027* (2013.01); *F02D 41/0085* (2013.01); *F02D 41/2438* (2013.01); *F02D 41/2467* (2013.01); *Y02T 10/125* (2013.01); *Y02T 10/32* (2013.01)

(56) References Cited

U.S. PATENT DOCUMENTS

| | | | |
|---|---|---|---|
| 7,650,223 B2 * | 1/2010 | Shiraishi | F02D 31/007 |
| | | | 123/376 |
| 9,086,022 B2 * | 7/2015 | Shimizu | F02B 19/1004 |
| 2007/0079598 A1 | 4/2007 | Bailey et al. | |
| 2013/0298869 A1 | 11/2013 | Hirzinger et al. | |
| 2019/0032589 A1 | 1/2019 | Frohlich et al. | |

FOREIGN PATENT DOCUMENTS

| | | |
|---|---|---|
| DE | 102008032741 B3 | 2/2010 |
| DE | 202014009562 U1 | 3/2016 |
| FR | 2879289 A1 | 12/2004 |
| FR | 2898936 A1 | 3/2006 |
| WO | 2010003780 A1 | 1/2010 |

OTHER PUBLICATIONS

Austrian Office Action for AT Application No. A50434/2016 dated Apr. 21, 2017; 3 pgs.

* cited by examiner

METHOD FOR DETECTING A GAS AMOUNT

TECHNOLOGY FIELD

This invention relates to a method for detecting the quantity of gas which is supplied by means of a gas supply device to an antechamber of an internal combustion engine, a method for detecting the quantity of gas which is supplied to at least two antechambers of an internal combustion engine by means of associated gas supply devices, a method for equalizing the quantity of gas which is supplied to at least two antechambers of an internal combustion engine by means of associated gas supply devices, and internal combustion engines.

BACKGROUND

In the prior art, it is not directly measured which quantity of gas is supplied to an antechamber of an internal combustion engine by means of a gas supply device. The monitoring of a functional state of the gas supply device of an individual antechamber is therefore not possible. The same problem arises when an equalization of the quantity of gas, which is supplied to at least two antechambers of an internal combustion engine by means of assigned gas supply devices, is to be undertaken.

SUMMARY OF THE DISCLOSURE

The object of the invention is to provide generic methods and internal combustion engines with which the functional state of the gas supply device of an individual antechamber can be checked without directly measuring the quantity of gas and/or the equalization of different antechambers can be performed.

This object is achieved by methods having the features of claim 1, 4 or 5 and internal combustion engines having the features of claim 9 or 10. The embodiments of the invention are defined in the dependent claims.

In a first variant of the invention, a comparison is performed of the change in the exhaust gas temperature resulting from the targeted disturbance of an exhaust gas generated in a combustion chamber connected to the antechamber with a target value of the change in the exhaust gas temperature. Since only the changes are compared, the knowledge of an absolute value of the quantity of gas or the exhaust gas temperature is not required. Although the quantity of gas supplied via the gas supply device(s) is not measured directly, the invention permits an indirect determination of this quantity of gas when it is known, from a theoretical model or by measurements as a ratio, how the exhaust gas temperature relates to the quantity of gas. In this case, it is of course also known how a change in the exhaust gas temperature relates to a change in the quantity of gas (by differentiating the exhaust gas temperature as a function of the quantity of gas). Thus, in the known context, it is possible to search for the change in the exhaust gas temperature which corresponds to the measured change. However, it is also known (via the analytically or graphically determined inverse function), at which function value of the function of the exhaust gas temperature, i.e. at which quantity of gas, this change occurs.

If the gas supply device is actively designed in such a way that it can be controlled by the control unit (e.g. active antechamber gas valve), then when a deviation is detected, a correction of the quantity of gas supplied can be performed if necessary, e.g. by the control unit modifying an opening duration and/or an opening time of the antechamber gas valve.

It is provided that a gradient of the exhaust gas temperature with respect to the quantity of gas is calculated taking account the change in the quantity of gas resulting from the targeted disturbance. Then the calculated gradient is compared with a target value of the gradient to make the deduction of the quantity of gas supplied by means of the gas supply device.

To detect the quantity of gas which is supplied to at least two antechambers of an internal combustion engine by means of assigned gas supply devices and a possible equalization, it is sufficient if, in a second variant of the invention, the changes in the exhaust gas temperatures of the different combustion chambers resulting from the disturbances made are compared with one another.

Then, at least one of the at least two antechambers can be actuated in such a way that any difference between the changes in the exhaust gas temperatures disappears. A difference equal to zero means that the quantity of gas is equalized. The determination of the quantities of gas supplied to the individual antechambers by the respective gas supply devices is therefore not required, but can be performed.

Of course, as described above, the change in the exhaust gas temperature in response to a disturbance with a target value could also be compared individually for each antechamber, and the quantities of gas supplied via the respective gas supply devices indirectly determined in this manner can be adjusted to one another by the control unit.

If the gas supply device(s) is or are designed as a channel or channels connected to an antechamber gas line, the targeted disturbance can be performed—individually for each gas supply device—by changing a gas pressure in the antechamber gas line and/or by changing a quantity of air supplied to the antechamber gas line.

If the gas supply device(s) is or are designed as (an) active antechamber gas valve(s) connected to an antechamber gas line, the targeted disturbance can be performed by changing an opening duration and/or an opening time of the antechamber gas valve(s).

It is provided that the targeted disturbance is performed in the direction of a reduced quantity of gas. Irrespective of the selected direction of the disturbance, it should ideally be selected to be so small that the operation of the internal combustion engine is not significantly disturbed.

All of the methods described above can be performed during the assembly or maintenance of an internal combustion engine. However, it is provided that a control unit of the internal combustion engine is designed in order to:

perform a targeted disturbance of the quantity of gas supplied by means of the gas supply device and by means of the temperature sensor, to measure a change of the exhaust gas temperature resulting from the targeted disturbance, and by comparison with a stored target value of the change in the exhaust gas temperature, to deduce the quantity of gas supplied by means of the gas supply device.

and/or for each of the at least two antechambers, to perform a targeted disturbance of the quantity of gas supplied by means of each gas supply device, and by means of the assigned temperature sensor, to measure a change of the exhaust gas temperature of each combustion chamber resulting from the targeted disturbance, and to determine a difference by comparing the resulting changes in the exhaust gas temperatures, and if necessary to actuate at least one of the at least two antechambers such that the difference disappears.

The above-described methods can then be performed automatically during the operation of the internal combustion engine after initiation by an operator or according to a predetermined maintenance schedule. If the operating state of a gas supply device is critical, a corresponding message can be issued. An equalization of the quantities of gas for all antechambers or combustion chambers of the internal combustion engine can be performed automatically.

The invention can be used in a stationary internal combustion engine, for marine applications or mobile applications such as the so-called "non-road mobile machinery" (NRMM). The internal combustion engine can be used as a mechanical drive, e.g. for operating compressor systems or coupled with a generator to a genset for generating electrical energy.

BRIEF DESCRIPTION OF THE DRAWINGS

Exemplary embodiments of the invention are discussed with reference to the figures. Description.

DETAILED DESCRIPTION

Figure 1:
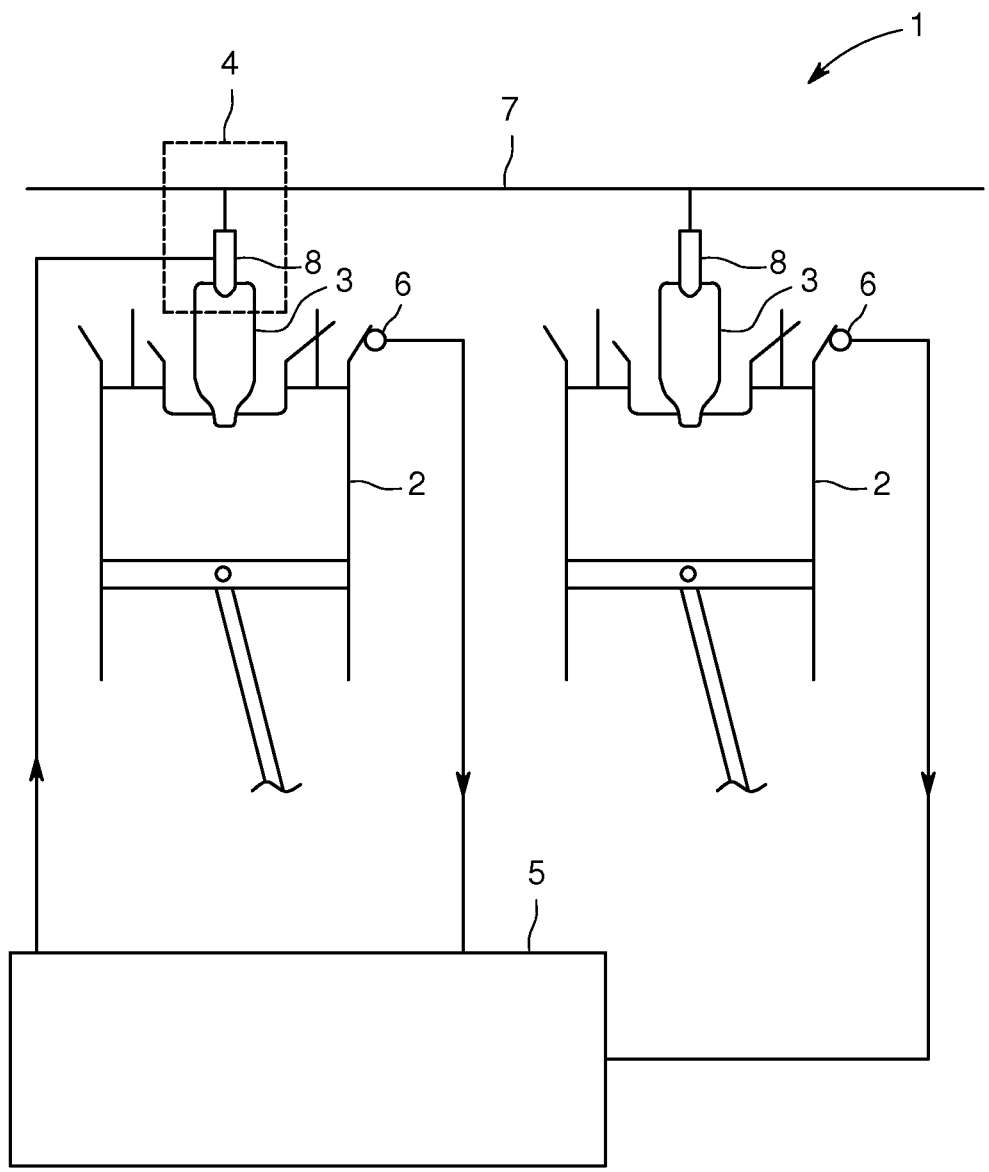
FIG. 1 shows schematically an internal combustion engine according to the invention

FIG. 1 shows an internal combustion engine 1 with several combustion chambers 2, each of which is connected to an antechamber 3. Each antechamber 2 has a gas supply device 4, which is designed here in the form of active antechamber gas valves 8 connected to an antechamber gas line 7. A control unit 5 (which is normally designed as a motor control device of the internal combustion engine) controls the gas supply to the antechambers 2. For each combustion chamber 2, there is a temperature sensor 6 for measuring an exhaust gas temperature T of an exhaust gas generated in the combustion chamber 2, whereby the temperature sensors 6 are connected to the control unit 5.

The control unit 5 is designed to perform a targeted disturbance Δu of the quantity of gas m supplied by means of the gas supply devices 4 to the individual antechambers 3 (e.g. by a slight change in the pressure in the antechamber gas line 7 or a change in an opening duration and/or an opening time of the antechamber gas valves 8) and by means of the temperature sensors 6 to measure the change ΔT in the exhaust gas temperature T resulting from the targeted disturbance Δu for each combustion chamber 2. By a comparison with a stored target value of the change $\Delta T_{target}$ in the exhaust gas temperature T, the control unit 5 can deduce the quantity of gas m supplied by means of the gas supply device 4.

Alternatively or additionally, it could be provided that the control unit 5 is designed to determine a difference by comparing the resulting changes ΔT in the exhaust gas temperatures T and to actuate at least one of the antechambers 3 such that the difference disappears. If the internal combustion engine has a common antechamber gas line 7 and passive gas valves which connect the individual antechambers 3 to the common antechamber gas line 7, the targeted disturbance Δu can only be performed globally (i.e. equally for all antechambers 3). In this case, after detecting a deviation in the quantity of gas supplied, no individual actuation can be performed in order to achieve equalization, but an exchange of the passive gas valve concerned would have to be performed. If active antechamber gas valves are provided, it is also possible to perform an equalization in the case of a common antechamber gas line 7 by individual actuation of at least one of the gas valves.

Figure 2:
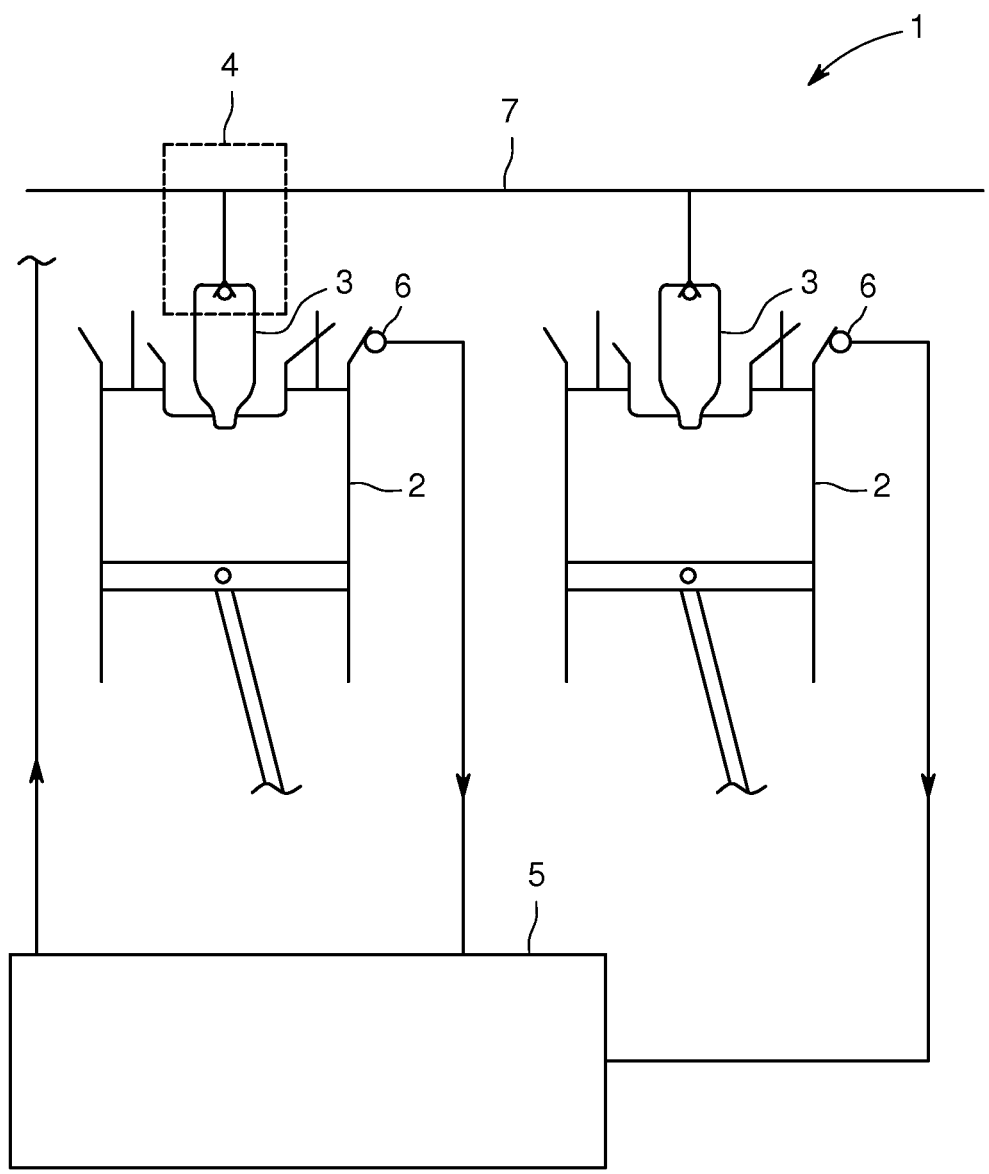
FIG. 2 shows schematically a further internal combustion engine according to the invention

FIG. 2 shows an internal combustion engine 1 which differs from that of FIG. 1 only in that, here, the gas supply devices 4 are designed as channels which are closed with a nonreturn valve and connected to an antechamber gas line 7. The control unit 5 can vary the pressure in the antechamber gas line 7 via actuators (not shown).

Figure 3:
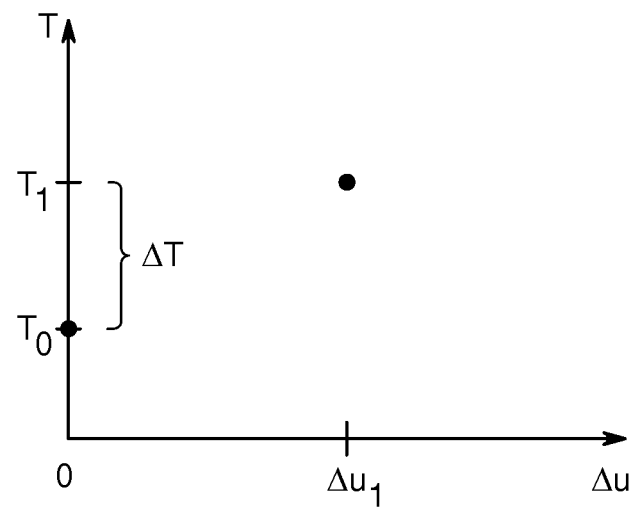
FIG. 3 shows a change of the exhaust gas temperature implementing a targeted disturbance FIG. 4 Relationship between exhaust gas temperature and quantity of gas

FIG. 3 shows a change in the exhaust gas temperature $T_0$ which occurs in the case of a targeted disturbance $\Delta u_1$ (here in the direction of a smaller quantity of gas m), which existed before the disturbance $\Delta u_1$, to a value $T_1$ which results from the disturbance $\Delta u_1$, so that the disturbance $\Delta u_1$ is connected to a change in the exhaust gas temperature ΔT.

Figure 4:
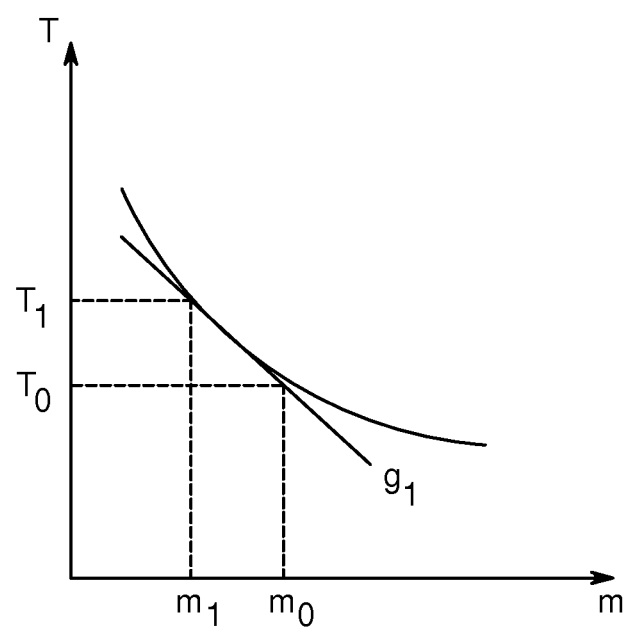

FIG. 4 shows schematically a relationship between the exhaust gas temperature T of an exhaust gas produced in the combustion chamber 2 connected to the antechamber 3 and the quantity of gas m which is supplied to the antechamber 3 by means of the gas supply device 4.

The tangent existing at a point m with a slope corresponding to the gradient dT/dm can be approximated by the drawn secant with the slope $g_1=(T_0-T_1)/(m_0-m_1)$. If the change in the exhaust gas temperature ΔT resulting from the disturbance $\Delta u_1$ is known, then it is possible to calculate the quotient $\Delta T/\Delta u_1$ and determine the point $m_0$ at which an identical slope or an identical gradient is present. This point $m_0$ corresponds to the quantity of gas m which is supplied to the antechamber 3 of the internal combustion engine 1 by means of the gas supply device 4.

What we claim is:

1. A method, comprising:
    causing a targeted disturbance (Δu) of a gas quantity (m) supplied by a gas supply to an antechamber fluidly coupled to a combustion chamber of an internal combustion engine;
    measuring a change (ΔT) resulting from the target disturbance (Δu) in an exhaust gas temperature (T) of an exhaust gas generated in the combustion chamber;
    comparing the change (ΔT) with a setpoint value of the change (ΔTtarget) of the exhaust gas temperature (T) to obtain a comparison; and
    deducing the gas quantity (m) supplied by the gas supply based on the comparison.

2. The method according to claim 1, comprising calculating a gradient (dT/dm) of the exhaust gas temperature (T) with respect to the quantity of gas (m) taking into account a change (Δm) in the quantity of gas (m) resulting from the targeted disturbance (Δu).

3. The method according to claim 2, comprising comparing the gradient (dT/dm) with a target value of the gradient (dT/dmtarget) to make the deduction of the quantity of gas (m) supplied by the gas supply.

4. A method, comprising:
    causing a targeted disturbance (Δu) of a quantity of gas (m) supplied to each antechamber of a plurality of antechambers of an internal combustion engine, wherein each antechamber of the plurality of antechambers is fluidly coupled to a respective gas supply of a plurality of gas supplies and a respective combustion chamber of a plurality of combustion chambers;

measuring a change (Δট) resulting from the targeted disturbance (Δu) in an exhaust gas temperature (T) of an exhaust gas generated in each combustion chamber of the plurality of combustion chambers;

comparing the changes (ΔT) in the exhaust gas temperatures (T) associated with the plurality of combustion chambers to obtain a comparison; and deducing a difference between the quantities of gas (m) supplied to the plurality of antechambers by the plurality of gas supplies based on the comparison.

5. The method according to claim 4, comprising:
controlling at least one of the quantities of gas (m) supplied to the plurality of antechambers to reduce the difference until the quantities of gas (m) are substantially equalized between the plurality of antechambers.

6. The method according to claim 4, wherein causing the targeted disturbance (Δu) comprises, for each of the plurality of antechambers:
changing a gas pressure in an antechamber gas line of each gas supply of the plurality of gas supplies; or
changing a quantity of air supplied to the antechamber gas line of each gas supply of the plurality of gas supplies.

7. The method according to claim 4, wherein causing the targeted disturbance (Δu) comprises, for each of the plurality of antechambers, changing an opening duration and/or an opening time of an antechamber gas of each gas supply of the plurality of gas supplies.

8. The method according to claim 4, wherein causing the targeted disturbance (Δu) comprises reducing the quantity of gas (m) supplied to each antechamber of the plurality of antechambers.

9. An internal combustion engine, comprising:
at least one combustion chamber;
an antechamber connected to the at least one combustion chamber;
a gas supply for the antechamber;
a control unit configured to control the gas supply;
a temperature sensor assigned to the at least one combustion chamber to measure an exhaust gas temperature (T) of an exhaust gas generated in the at least one combustion chamber, wherein the temperature sensor is connected to the control unit, wherein the control unit is designed to:
cause a targeted disturbance (Δu) of the quantity of gas (m) supplied by the gas supply to the antechamber;
measure, via the temperature sensor, a change (ΔT) of the exhaust gas temperature (T) resulting from the targeted disturbance (Δu);
compare the change (ΔT) with a stored target value of the change (ΔTtarget) in the exhaust gas temperature (T) to obtain a comparison; and
deduce the quantity of gas (m) supplied by the gas supply based on the comparison.

10. An internal combustion engine, comprising:
at least two combustion chambers;
at least two antechambers, each connected to one of the at least two combustion chambers;
a gas supply for each of the at least two antechambers;
a control unit configured to control the gas supplies;
at least two temperature sensors, each assigned to one of the at least two combustion chambers and configured to measure an exhaust gas temperature (T) of an exhaust gas generated in the respective one of the at least two combustion chambers, wherein each of the at least two temperature sensors is connected to the control unit, wherein the control unit is designed to:
cause, for each of the at least two antechambers, a targeted disturbance (Δu) of a quantity of gas (m) supplied by the gas supply;
measure, via the temperature sensor assigned to each of the at least two combustion chambers, a change (ΔT) of the exhaust gas temperature (T) of each of the at least two combustion chambers resulting from the targeted disturbance (Δu);
compare the changes (ΔT) of the exhaust gas temperatures (T) associated with the at least two combustion chambers to obtain a comparison; and
deduce a difference between the quantities of gas (m) supplied to the at least two antechambers based on the comparison.

11. The internal combustion engine according to claim 10, wherein the control unit is designed to actuate at least one of the at least two antechambers in such a way that the difference disappears.

12. The internal combustion engine according to claim 10, wherein each of the gas supplies comprises an antechamber gas line, and the control unit is designed to cause the targeted disturbance (Δu) by changing a gas pressure in the antechamber gas line and/or by changing a quantity of air supplied to the antechamber gas line.

13. The internal combustion engine according to claim 10, wherein each of the gas supplies comprises an active antechamber gas valve, and the control unit is designed to cause the targeted disturbance (Δu) by changing an opening duration and/or an opening time of the antechamber gas valve.

14. A method, comprising:
causing a targeted disturbance (Δu) of a gas quantity (m) supplied to a first antechamber fluidly coupled to a first combustion chamber and/or a second antechamber fluidly coupled to a second combustion chamber of an internal combustion engine;
measuring a change (ΔT) resulting from the target disturbance (Δu) in an exhaust gas temperature (T) of an exhaust gas generated in the first combustion chamber and/or the second combustion chamber; and
deducing at least one aspect of the gas quantity (m) supplied to the first antechamber and/or the second antechamber based on the change (ΔT) resulting from the target disturbance (Δu).

15. The method of claim 14, wherein the at least one aspect comprises a difference between the gas quantity (m) supplied to the first antechamber and the gas quantity (m) supplied to the second antechamber.

16. The method of claim 15, comprising substantially equalizing the gas quantity (m) supplied to the first and second antechambers to substantially eliminate the difference.

17. The method of claim 14, wherein the at least one aspect comprises a deduced value of the gas quantity (m) supplied to the first antechamber.

18. The method of claim 14, wherein causing the targeted disturbance (Δu) comprises temporarily deviating the gas quantity (m) away from a normal operational gas quantity (m) for the internal combustion engine.

19. The method of claim 14, wherein causing the targeted disturbance (Δu) comprises controlling an active gas supply valve, a pressure in a gas supply line, or a combination thereof.

20. The method of claim 14, comprising comparing the change ($\Delta T$) with a setpoint value of the change ($\Delta T\text{target}$) of the exhaust gas temperature (T) to obtain a comparison.

* * * * *